United States Patent [19]

Sato et al.

[11] 4,191,345

[45] Mar. 4, 1980

[54] TAPE CASSETTE

[75] Inventors: Takateru Sato; Shigemasa Shoji, both of Tokyo, Japan

[73] Assignee: TDK Electronics Company, Limited, Tokyo, Japan

[21] Appl. No.: 932,017

[22] Filed: Aug. 8, 1978

[30] Foreign Application Priority Data

Nov. 24, 1977 [JP] Japan .................... 52-157732[U]

[51] Int. Cl.² ............................................. G03B 1/04
[52] U.S. Cl. ................................. 242/197; 226/196
[58] Field of Search .......... 242/76, 55.19 A, 197–200, 242/157 R; 226/196–199, 181

[56] References Cited

U.S. PATENT DOCUMENTS

| | | | |
|---|---|---|---|
| 3,462,057 | 8/1969 | Yamamoto | 226/181 |
| 3,710,039 | 1/1973 | McFadden | 226/196 X |
| 3,751,043 | 8/1973 | Bracci | 242/199 X |
| 3,787,229 | 1/1974 | Rudness | 242/157 R |
| 3,991,956 | 11/1976 | Machida | 242/199 |
| 4,062,484 | 12/1977 | Rausch et al. | 226/196 |

*Primary Examiner*—Leonard D. Christian
*Attorney, Agent, or Firm*—Oblon, Fisher, Spivak, McClelland & Maier

[57] ABSTRACT

A tape cassette comprises a tape guide having a cylindrical surface formed by hard chromium plating or nickel plating. The tape guide is a cylindrical plate having a slit parallel to the axis. The cylindrical tape guide has a groove at one end of the guide and is fitted to a post having a projection mounted on a half-case under connecting the groove of the guide to the projection of the post to contact the tape with the surface formed by the hard chromium plating or nickel plating.

3 Claims, 12 Drawing Figures

TAPE CASSETTE

BACKGROUND OF THE INVENTION

1. Field of the Invention

The present invention relates to a tape cassette having a tape guide for prolonging a life of a tape.

2. Description of the Prior Art

A guide is known for guiding a running of a tape which is disposed in a tape cassette or cartridge having at least one reel for winding the tape in a case.

In the conventional auido tape cassette, the guide has usually consisted of a roller and a fixed pin made of a plastic.

It has been well-known that the wearing of the fixed pin made of a plastic is caused depending upon the increase of slips of the tape.

In the case of the video tape cassette, plastic powder formed by the wearing phenomenon deposits on the magnetic layer of the tape whereby a drop-out is induced. This is the fatal defect for the video tape cassette. In order to prevent these troubles, a pin mounted on a plastic case is formed instead of the fixed pin and a metal pipe is fixed on the pin in the conventional video tape cassette.

In general, the conventional metal pipe is prepared by cutting and grinding a metal rod.

Many steps are required for cutting and grinding the metal rod so as to necessitate a high cost. In order to overcome the disadvantage of the conventional tape cassette, the inventors have proposed new type tape cassette in our previous application (Japanese Utility Model Application No. 106792/1976).

This structure will be illustrated.

The guide is different from the above-mentioned roller and is not rotated and accordingly, it is not always necessary to have smooth surface for all cylindrical surfaces. That is, the surface which is not contacted with the tape need not be smooth. Accordingly, the guide can be formed by bending one sheet of a plate in a cylindrical shape and the seam i.e. the slit is disposed to the position on which the tape is not contacted.

The cylindrical guide is prepared by processing a plan sheet. It is preferable to use a plate which is relatively flexible and anticorrosive. For this purpose, a stainless steel sheet is usually used.

These sheets have relatively low hardness so as to be difficult to obtain a smooth surface having no mar by polishing the surface.

When fine mars remain after the polishing treatment, the tape is shaved by the mar to cause the drop-out.

When a processible hard substance is used, this trouble can be dissolved. However, crackings are formed in the step of bending the hard sheet in the cylindrical form. Accordingly, it is impossible to use such processible hard substance in practice.

SUMMARY OF THE INVENTION

It is an object of the present invention to provide a tape cassette having a tape guide which can be easily prepared without forming crackings and which has a smooth hard surface having no mar.

It is another object of the present invention to prolong the life of a tape in a tape cassette especially a video tape cassette.

The foregoing and other objects of the present invention have been attained by providing a tape cassette comprising a tape guide having a cylindrical surface formed by hard chromium plating or nickel plating.

DETAILED DESCRIPTION OF THE PREFERRED EMBODIMENTS

One embodiment of the previous invention will be illustrated.

Figure 1:
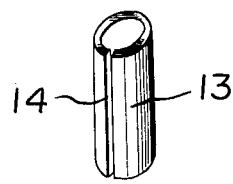
FIG. 1 is a schematic view of one embodiment of a guide in the tape cassette of our previous invention.

FIG. 1 shows a guide (13) for the tape cassette according to the previous invention. The guide (13) is prepared by bending one sheet of a metal plate in a cylindrical shape whereby a slit (14) is formed.

In order to set the tape guide (13) on the tape cassette, the guide can be fixed between the upper and lower half-cases from both sides with screws.

Figure 2:
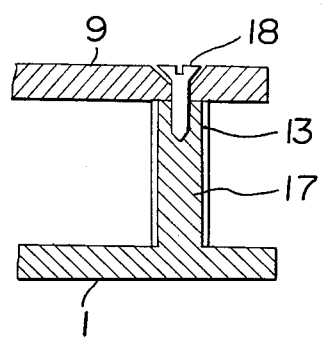
FIGS. 2 to 4 are respectively sectional views of the guide fitted in the tape cassette by certain different manners.

The thickness of the tape guide (13) can be thin by bending a metal plate in a cylindrical shape. Accordingly, as shown in FIG. 2, the tape guide (13) can be fitted on a post (17) projected from the lower half-case (1) or the upper half-case (9) as one piece (In FIG. 2, it is projected from the lower half-case (1).) and the post (17) is fixed to the other half-case (In FIG. 2, it is the upper half-case (9).) with a screw (18).

Figure 3:
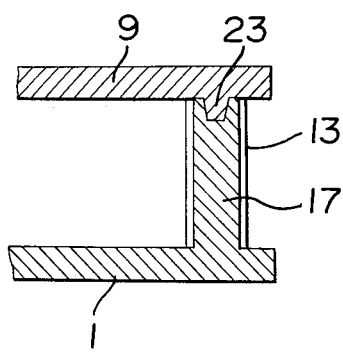

As shown in FIG. 3, the projected part (23) of the upper half-case (9) can be fitted in the post (17) to fix them instead of the screw.

Figure 4:
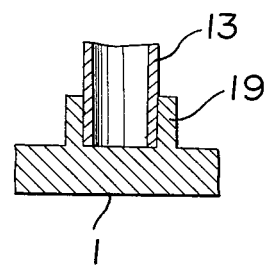

As shown in FIG. 4, the cylindrical tape guide (13) can be fitted to the inner part of the cylindrical frame (19) of one half-case (FIG. 4, it is the lower half-case (1).) to fix them.

In all cases, the fitting is further satisfactory by utilizing the resilient effect of the cylindrical tape guide (13) with the slit (14).

In the tape cassette proposed in the previous invention, the cylindrical tape guide has the slit and accordingly, it is necessary that the slit should be disposed to prevent the contact with the tape.

Figure 5:
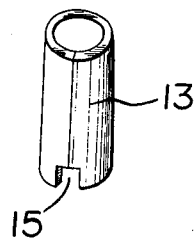
FIG. 5 is a schematic view of one embodiment of a cylindrical tape guide used in the tape cassette of our previous invention.
Figure 6:
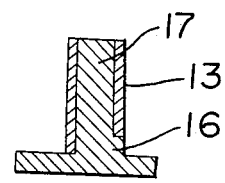
FIGS. 6 and 7 are respectively a sectional view and an expanded schematic view showing the cylindrical tape guide fitted on a pole of a half-case.
Figure 7:
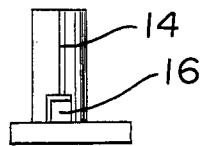

An improvement of the tape cassette has been proposed. In the improvement, a groove (15) is formed at one end of the cylindrical tape guide (13) as shown in FIG. 5. On the other hand, a projection (16) is formed on a post (17) as shown in FIGS. 6 and 7 whereby the groove (15) is fitted to the projection (16) by fitting the cylindrical tape guide (13) to the post (17). Thus, the position of the cylindrical tape guide (13) is precisely fixed whereby the trouble of shifting the slit (14) to a position contacting with the tape. (Japanese Utility Model Application No.67370/1977.)

Figure 8:
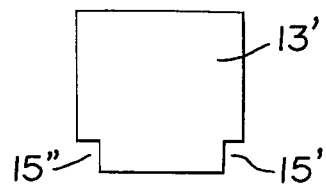
FIG. 8 is a schematic view of the cylindrical tape guide.

The groove (15) can be formed at any suitable part of the end of the cylindrical tape guide (13). When the groove (15) is formed on the slit (14), the groove (15) can be formed by notches (15'), (15") (not a groove) at both ends of a plate (13') for the cylindrical tape guide (13) in the case of bending one sheet of the plate to form the cylindrical tape guide (13) as shown in FIG. 8. Accordingly, the fabrication of the cylindrical tape guide having the groove is easily prepared.

Figure 9:
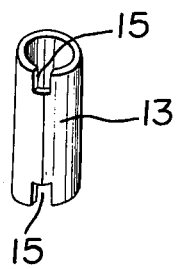
FIG. 9 is a schematic view of the other embodiment of the cylindrical tape guide.

It is possible to form the groove (15) at the ends of the cylindrical tape guide (13) as shown in FIG. 9.

In the preparation of the cylindrical metal guide of the tape cassettes, it is preferable to use a metal sheet having flexibility and anticorrosive property for processing the metal sheet. Accordingly, stainless steel sheet has been used.

It is difficult to obtain a smooth surface having no mar by polishing the surface because the stainless steel has relatively low hardness. When fine mars are remained after polishing the surface, the tape is shaved to cause the drop-out.

When a processible hard substance is used, the difficulty can be dissolved. However, cracking is caused in bending the sheet and accordingly, it is impossible to use it.

The present invention is to provide the tape cassette having such disadvantage.

Figure 10:
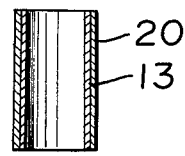
FIG. 10 is a sectional view of one embodiment of a tape guide used in the tape cassette of the present invention.

FIG. 10 is a sectional view of the tape guide (13) for the tape cassette of the present invention. The surface of the tape guide (13) has a layer (20) formed by the hard chromium plating or nickel plating.

Figure 11:
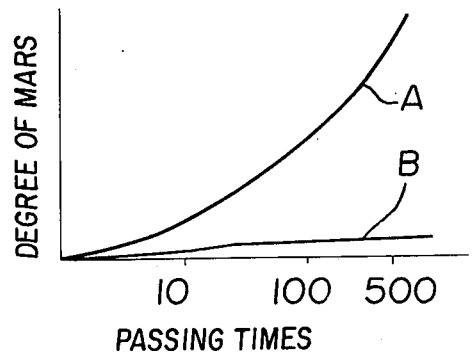
FIG. 11 is a characteristic curve diagram of the tape cassette of the present invention and the conventional tape cassette.

As shown in FIG. 11, the mars of the tape guide of the tape cassette of the present invention are significantly small even after 500 time passings as the curve B in comparison with that of the stainless steel conventional tape cassette as the curve A.

The mar increase coefficient was measured by passing a tape having a width of ¼ inch and a length of 30 cm under a weight of 50 g on the tape guide for 10 times and counting the increase of mars on the surface of the tape guide.

The tape guide is preferably a metal sheet bent in the cylindrical shape described. However, it is possible to use a tape guide made of plastic having a surface layer formed by the hard chromium plating or nickel plating.

In accordance with the present invention, mars are not easily caused on the surface of the tape guide of the tape cassette whereby a drop-out is not caused.

The thickness of the layer formed by the hard chromium plating or nickel plating is to completely cover the surface of the substrate of the tape guide after sliding the tape on the layer.

Figure 12:
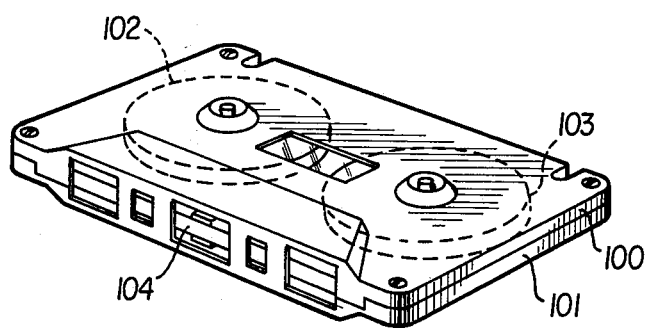
FIG. 12 shows a conventional tape cassette.

FIG. 12 shows a conventional tape cassette including first and second half-cases 100,101, reels 102, 103 disposed therein and a tape 104 feed from one reel.

What is claimed as new and desired to be secured by Letters Patent of the United States is:

1. In a tape cassette comprising first and second half-cases, a reel disposed therein, a tape fed from said reel and a cylindrical tape guide for guiding tape fed from said reel, an improvement therein which comprises:
   said cylindrical tape guide includes a surface layer formed by a hard chromium plating or nickel plating wherein said cylindrical tape guide includes a slit formed in the axial direction thereof and further comprises a plastic substrate upon which said surface layer is formed.

2. In a tape cassette comprising first and second half-cases, a reel disposed therein, a tape fed from said reel and a cylindrical tape guide for guiding tape fed from said reel, an improvement therein which comprises;
   said cylindrical tape guide includes a surface layer formed by a hard chromium plating or nickel plating, said cylindrical tape guide comprising a metal plate upon which said surface layer is formed and which is bent into a cylindrical shape;
   a post extending from said first half-case; and
   a projection extending from said post wherein said cylindrical tape guide includes a groove in at least one end thereof which is fitted to said projection.

3. In a tape cassette comprising first and second half-cases, a reel disposed therein, a tape fed from said reel and a cylindrical tape guide for guiding tape fed from said reel, an improvement therein which comprises;
   said tape guide includes a surface layer formed by a hard chromium plating or nickel plating, wherein said cylindrical tape guide further includes a slit formed in the axial direction thereof;
   a post extending from said first half-case; and
   a projection extending from said post wherein said cylindrical tape guide includes a groove in at least one end thereof which is fitted to said projection.

* * * * *